July 8, 1924.
C. A. KUHN
VEHICLE SIGNAL
Filed Feb. 20, 1922
1,500,998
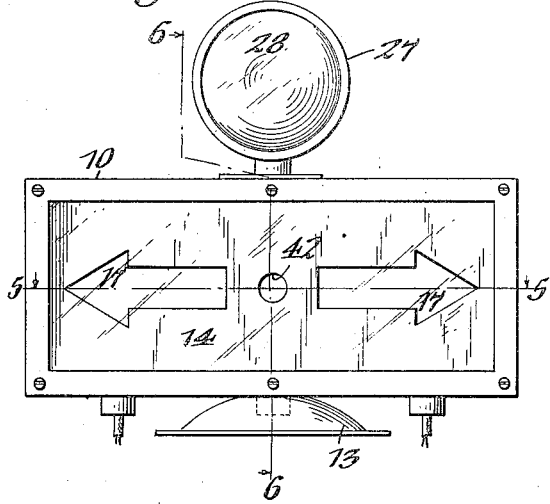
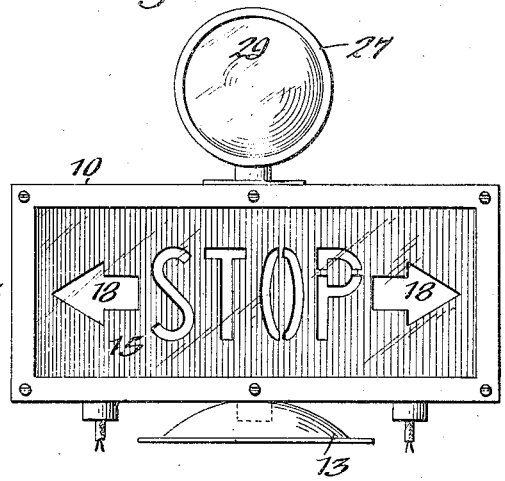
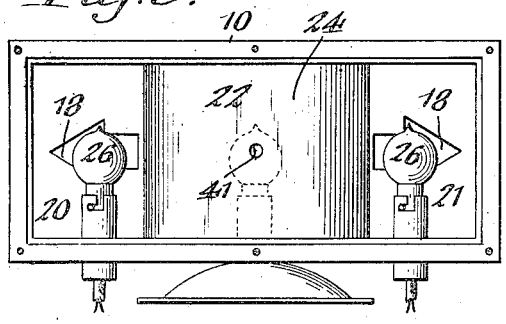
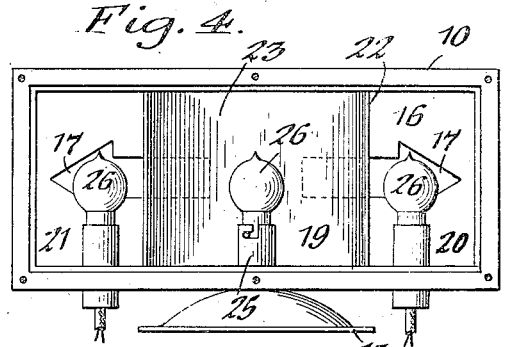
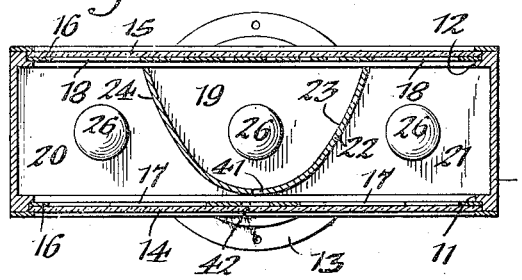
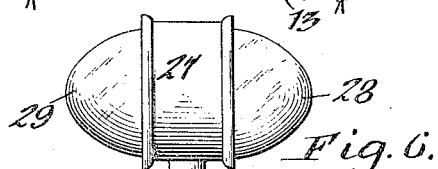
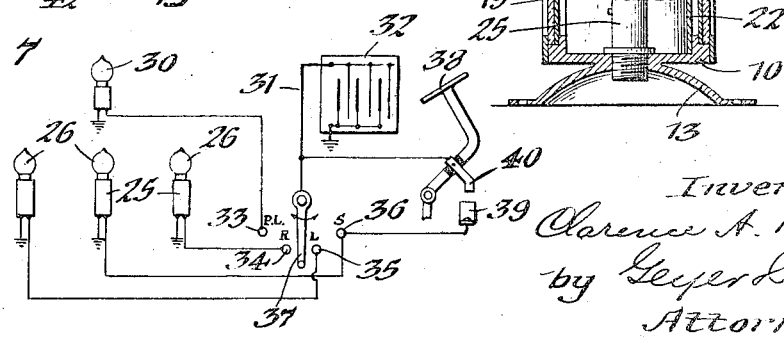
Inventor
Clarence A. Kuhn,
by Geyer Doppp
Attorneys.

Patented July 8, 1924.

1,500,998

UNITED STATES PATENT OFFICE.

CLARENCE A. KUHN, OF FORKS, NEW YORK.

VEHICLE SIGNAL.

Application filed February 20, 1922. Serial No. 537,812.

*To all whom it may concern:*

Be it known that I, CLARENCE A. KUHN, a citizen of the United States, residing at Forks, in the county of Erie and State of New York, have invented new and useful Improvements in Vehicle Signals, of which the following is a specification.

This invention relates to a vehicle signal for indicating to traffic officers, pedestrians and occupants of other cars, the intentions of the driver as to whether he will turn to the right or left, or stop.

Its chief object is to provide a signal of this character in which the stop indication is visible from the rear end of the vehicle and the direction indications visible from both front and rear ends thereof.

Another object is to provide a vehicle signal which is simple and compact in construction, which can be manufactured at a moderate cost, and which is reliable in operation and easily controlled.

In the accompanying drawings: Figure 1 is a front view of the improved signal. Figure 2 is a rear view thereof. Figure 3 is a view similar to Fig. 1, but showing the front indicator wall removed. Figure 4 is a view similar to Fig. 2, but showing the rear indicator wall removed. Figure 5 is a horizontal section on line 5—5, Fig. 1. Figure 6 is a transverse section on line 6—6, Fig. 1. Figure 7 is a diagrammatic view showing the electric circuit of the signal lamps.

Similar characters of reference indicate corresponding parts throughout the several views.

10 represents the casing of the signal which may be of rectangular or any other appropriate shape and which is provided at its front and rear sides with openings 11 and 12, respectively. The bottom of the casing is provided with a supporting base 13 for attaching it to the fender or other part of the vehicle where the signal is conspicuous and capable of being seen from both its front and rear ends.

Applied to the openings in the casing are cover-plates or walls 14, 15, the front plate 14 being preferably constructed of white frosted glass and the rear plate 15 of red frosted glass. These plates may be removably fastened to the corresponding sides of the casing in any suitable manner. The inner side of each transparent plate is provided with a stencil sheet or card 16, the front stencil bearing two horizontal arrows 17 pointing in opposite directions, while the rear stencil bears the word "Stop" arranged centrally thereof and horizontal arrows 18 arranged on opposite sides of said word "Stop" and also pointing in opposite directions. The arrow heads of both stencil sheets are preferably disposed in horizontal alinement with one another and the shank portions of the front set of arrows are somewhat longer than the corresponding portion of the rear set.

The casing is divided transversely into a series of three lamp compartments 19, 20 and 21. Separating the latter from one another is a single upright partition 22 which is preferably of circular or parabolic form and arranged centrally of the casing, whereby the central compartment 19 faces rearwardly, while the end compartments 20 and 21 face forwardly and rearwardly. Said parabolic partition constitutes the central compartment and isolates the end compartments therefrom. This partition may be securely fastened to the top and bottom of the casing 10 by soldering or otherwise. The distance between the free upright edges of the partition is such as to include the word "Stop" at the rear end of the casing between them. Said partition is preferably constructed of sheet metal and its concave and convex sides are highly polished to form reflecting surfaces 23 and 24, respectively.

Located in the bottom of each lamp compartment is a socket 25 for receiving an electric lamp 26 which is preferably of the frosted type to diffuse the light and show up the indicating characters of the signal clearly and conspicuously. These lamps are positioned in their respective compartments so that they are directly in line with the indicating characters as shown in Figs. 3 and 4.

By arranging the partition 22 in the manner shown, it not only divides the casing into a central compartment facing in one direction and isolated end compartments facing in opposite directions, but its inner or concave surface 23 forms a reflector for the central lamp to illuminate the "stop" signal, while the outer or convex surface 24 of said partition serves as a reflector for the end lamps to illuminate the direction indicating arrows at the front and rear sides of the signal casing.

The top of said signal casing may be provided with a parking lamp including a case 27, a white front lens 28, a red rear lens 29 and an electric lamp 30 arranged centrally in said case.

The signal lamps 26 and parking lamp 30 are included in a suitable electric circuit 31 receiving its current from a storage battery 32 or other source. Any suitable switch may be provided for selectively controlling the several lamps, that shown in Fig. 7 of the drawings comprising a series of four contacts 33, 34, 35 and 36 and a movable switch lever 37 adapted to engage any one of the latter. This switch may be located on the dash board or steering wheel of the vehicle where it can be conveniently and easily manipulated. If desired, the central or "stop" signal lamp 26 may also be controlled by the brake or clutch lever 38 of the vehicle. In this instance, a stationary switch member 39 and a movable switch member 40 carried by the lever 38 is included in the "stop" signal circuit, so that when said lever is depressed the circuit is closed and the corresponding lamp 26 lighted. When the switch lever 37 is moved to either of the direction-indicating contacts 34, 35, the corresponding circuit is closed, informing the traffic officers and pedestrians, as well as the occupants of followings cars, the intentions of the driver as to which direction he is about to turn.

If desired, the central curved portion of the partition 22 may be provided with a small light-emitting opening 41, and the front stencil sheet 16 may be provided with a corresponding alining opening 42, whereby, when the "stop" signal is being displayed, a small ray of light will also show to the front through said openings and inform traffic officers and others in front of the vehicle, that the driver intends to stop.

It will be understood from the foregoing that the stencil sheets 16 may be dispensed with and the indicating characters placed directly on the front and rear transparent plates 14 and 15, respectively.

I claim as my invention:

1. A vehicle signal, comprising a casing having a central lamp compartment and end lamp compartments at opposite sides thereof formed by a curved partition arranged centrally in an upright position in said casing and isolating the central compartment from the end compartments, the casing having a rear wall bearing a "stop" indication located opposite the concave side of said partition and direction indications located opposite said end compartments, said casing having a front wall bearing direction indications located opposite said end compartments, the concave and convex sides of said partitions forming reflecting surfaces for the lamps in the central and end compartments, respectively.

2. A vehicle signal, comprising a casing having indicating characters on its front and rear walls, a combined partition and reflector arranged centrally in an upright position in said casing, said partition being curved and extending from front to rear of the casing, forming a central lamp compartment and end lamp compartments, the central compartment facing rearwardly and the end compartments facing forwardly and rearwardly, one side of said partition forming a reflector for the central compartment and the other side forming a reflector for the end compartments.

CLARENCE A. KUHN.